US008776172B2

(12) United States Patent
Yamasaki

(10) Patent No.: US 8,776,172 B2
(45) Date of Patent: Jul. 8, 2014

(54) INFORMATION SHARING DEVICE, INFORMATION SHARING METHOD AND INFORMATION SHARING SYSTEM

(75) Inventor: Kentaro Yamasaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 27 days.

(21) Appl. No.: 13/260,093

(22) PCT Filed: Mar. 15, 2010

(86) PCT No.: PCT/JP2010/054760
§ 371 (c)(1),
(2), (4) Date: Sep. 23, 2011

(87) PCT Pub. No.: WO2010/110193
PCT Pub. Date: Sep. 30, 2010

(65) Prior Publication Data
US 2012/0036555 A1    Feb. 9, 2012

(30) Foreign Application Priority Data
Mar. 24, 2009  (JP) .................................. 2009-071217

(51) Int. Cl.
*G06F 21/62*  (2013.01)

(52) U.S. Cl.
USPC .......................................................... 726/2

(58) Field of Classification Search
USPC .......................................................... 726/2
See application file for complete search history.

(56) References Cited

U.S. PATENT DOCUMENTS

| 7,761,922 | B1 * | 7/2010 | Baum et al. ...................... 726/26 |
| 7,937,754 | B2 * | 5/2011 | Katano et al. ................... 726/18 |
| 8,176,064 | B2 * | 5/2012 | Huomo et al. ................. 707/758 |
| 8,327,150 | B2 * | 12/2012 | Yamamoto et al. ........... 713/178 |
| 2002/0046336 | A1 * | 4/2002 | Kon et al. ...................... 713/156 |
| 2003/0084294 | A1 * | 5/2003 | Aoshima et al. .............. 713/169 |
| 2003/0135732 | A1 * | 7/2003 | Vaha-Sipila .................... 713/156 |
| 2005/0066163 | A1 * | 3/2005 | Ikenoya ........................ 713/156 |
| 2006/0055507 | A1 * | 3/2006 | Minowa ........................ 340/5.1 |
| 2006/0059549 | A1 * | 3/2006 | Suzuki et al. ...................... 726/9 |
| 2006/0200857 | A1 * | 9/2006 | Yokota ............................... 726/6 |
| 2006/0242263 | A1 * | 10/2006 | Sato et al. ..................... 709/217 |
| 2007/0055865 | A1 * | 3/2007 | Kakii ............................ 713/156 |
| 2008/0046720 | A1 * | 2/2008 | Sugishita et al. ............. 713/156 |
| 2008/0065895 | A1 * | 3/2008 | Liu et al. ....................... 713/176 |
| 2008/0262993 | A1 * | 10/2008 | Uematsu et al. ................. 707/1 |
| 2008/0307229 | A1 * | 12/2008 | Andersson et al. ........... 713/176 |
| 2009/0083838 | A1 * | 3/2009 | Neau ............................... 726/5 |
| 2009/0214042 | A1 * | 8/2009 | Nakahara et al. ............. 380/278 |
| 2010/0161969 | A1 * | 6/2010 | Grebovich et al. ........... 713/156 |
| 2011/0060904 | A9 * | 3/2011 | Whitfield ...................... 713/156 |

* cited by examiner

*Primary Examiner* — Techane Gergisco
(74) *Attorney, Agent, or Firm* — Sughrue Mion, PLLC

(57) ABSTRACT

The load of setting and managing the access rule for access control is large. Provided is an information sharing system comprising an information gathering means, a transportable storage device for storing at least first information and second information, a certified acquisition request generation means, and a certified acquisition request processing means, sheering the information gathering means gathers the first information and the second information from the transportable storage device, the certified acquisition request generation means transmits a certified acquisition request including certification information comprising at least part of the second information, and the certified acquisition request processing means determines, on the basis of the result of checking whether or not the certification information included in the received certified acquisition request matches any part of the first information, whether or not to transmit the first information to a device equipped with the certified acquisition request generation means that is a transmission source of the certified acquisition request.

50 Claims, 12 Drawing Sheets

Fig.2

```
                    600 LOGISTICS INFORMATION
<event>
 <eventTime>2008-12-01T080031</eventTime>
                     630 EVENT TIME
 <id>urn:id:xxx...</id>
          620 UNIQUE IDENTIFIER
 <bizStep>arrival</bizStep>
              640 EVENT STEP
 <readPoint>loc01</readPoint>
              650 READ POINT
 <bizLocation>loc02</bizLocation>
               660 EXISTING LOCATION OF TAG
</event>
```

Fig.3

```
<param>
<name>id</name>
<value>urn:id:yyy...</value>          ~710 ACQUISITION IDENTIFIER
</param>
<certification>
<eventTime>2008-12-01T080031</eventTime>   ~730 EVENT TIME
<id>urn:id:xxx...</id>                ~720 UNIQUE IDENTIFIER
<bizStep>arrival</bizStep>            ~740 EVENT STEP
<readPoint>loc01</readPoint>          ~750 READ POINT
<bizLocation>loc02</bizLocation>      ~760 EXISTING LOCATION OF TAG
</certification>
```

700 CERTIFIED ACQUISITION REQUEST

790 PROOF LOGISTICS INFORMATION (braces around eventTime, id, bizStep, readPoint, bizLocation)

Fig.7

```
<event>
<eventTime>2008-12-01T080031</eventTime>
<id>urn:id:xxx...</id>
<bizStep>arrival</bizStep>
<readPoint>loc01</readPoint>
<bizLocation>loc02</bizLocation>
<sensor>
<startTime>2008-12-01T000023</startTime>
<endTime>2008-12-01T080031</endTime>
</sensor>
</event>
```

600 LOGISTICS INFORMATION
630 EVENT TIME
620 UNIQUE IDENTIFIER
640 EVENT STEP
650 READ POINT
660 EXISTING LOCATION OF TAG
671 MEASUREMENT START TIME
672 MEASUREMENT STOP TIME
670 SENSOR DATA

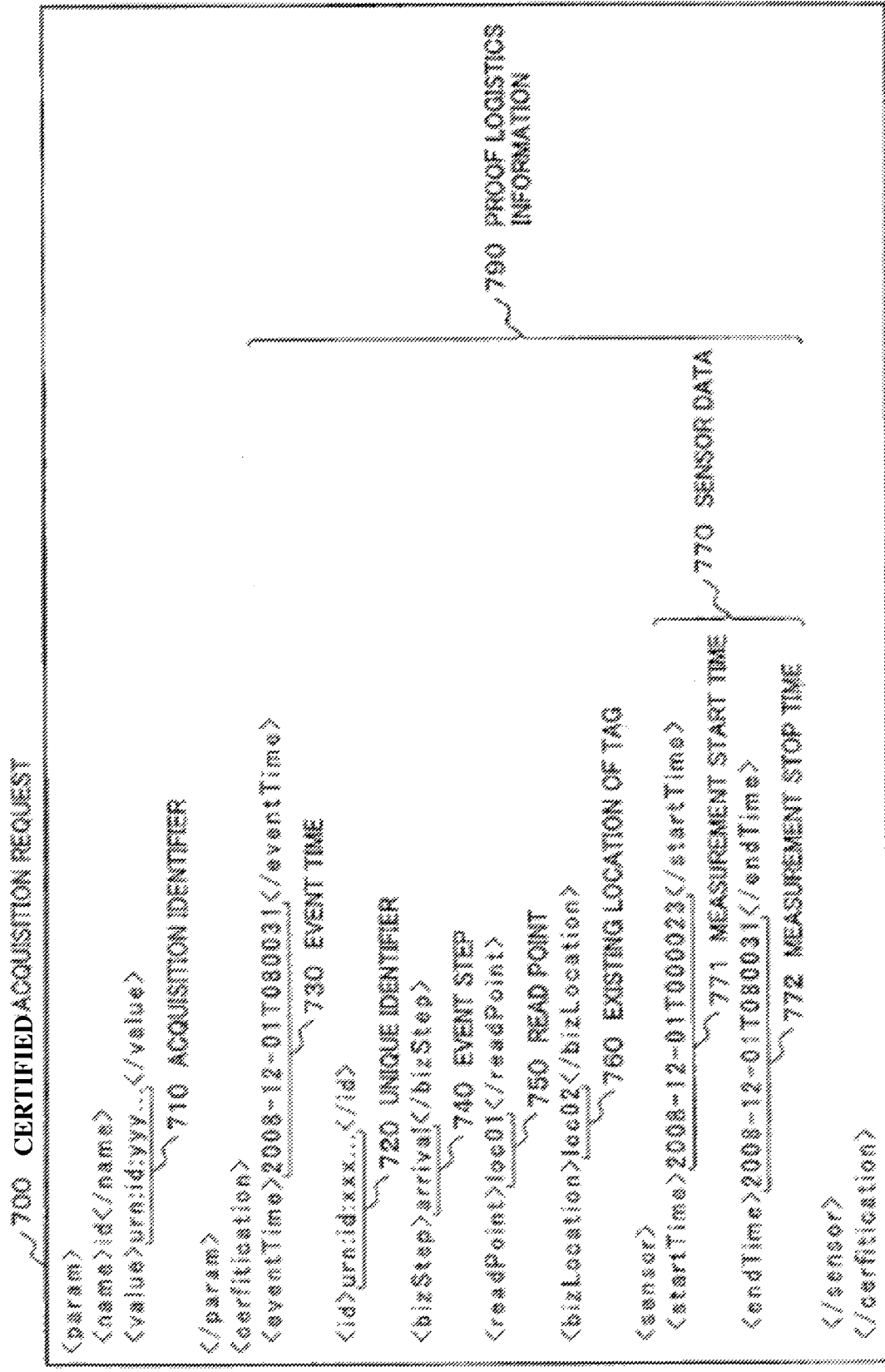

Fig.9

```
<event>
<eventTime>2008-12-01T080031</eventTime>
<id>urn:id:xxx...</id>
<bizStep>arrival</bizStep>
<readPoint>loc01</readPoint>
<bizLocation>loc02</bizLocation>
<sensor>
<startTime>2008-12-01T000023</startTime>
<endTime>2008-12-01T080031</endTime>
<interval>600</interval>
<data>01A1A532C...</data>
</sensor>
</event>
```

- 600 LOGISTICS INFORMATION
- 630 EVENT TIME
- 620 UNIQUE IDENTIFIER
- 640 EVENT STEP
- 650 READ POINT
- 660 EXISTING LOCATION OF TAG
- 670 SENSOR DATA
- 671 MEASUREMENT START TIME
- 672 MEASUREMENT STOP TIME
- 673 MEASUREMENT INTERVAL
- 674 MEASURED VALUE

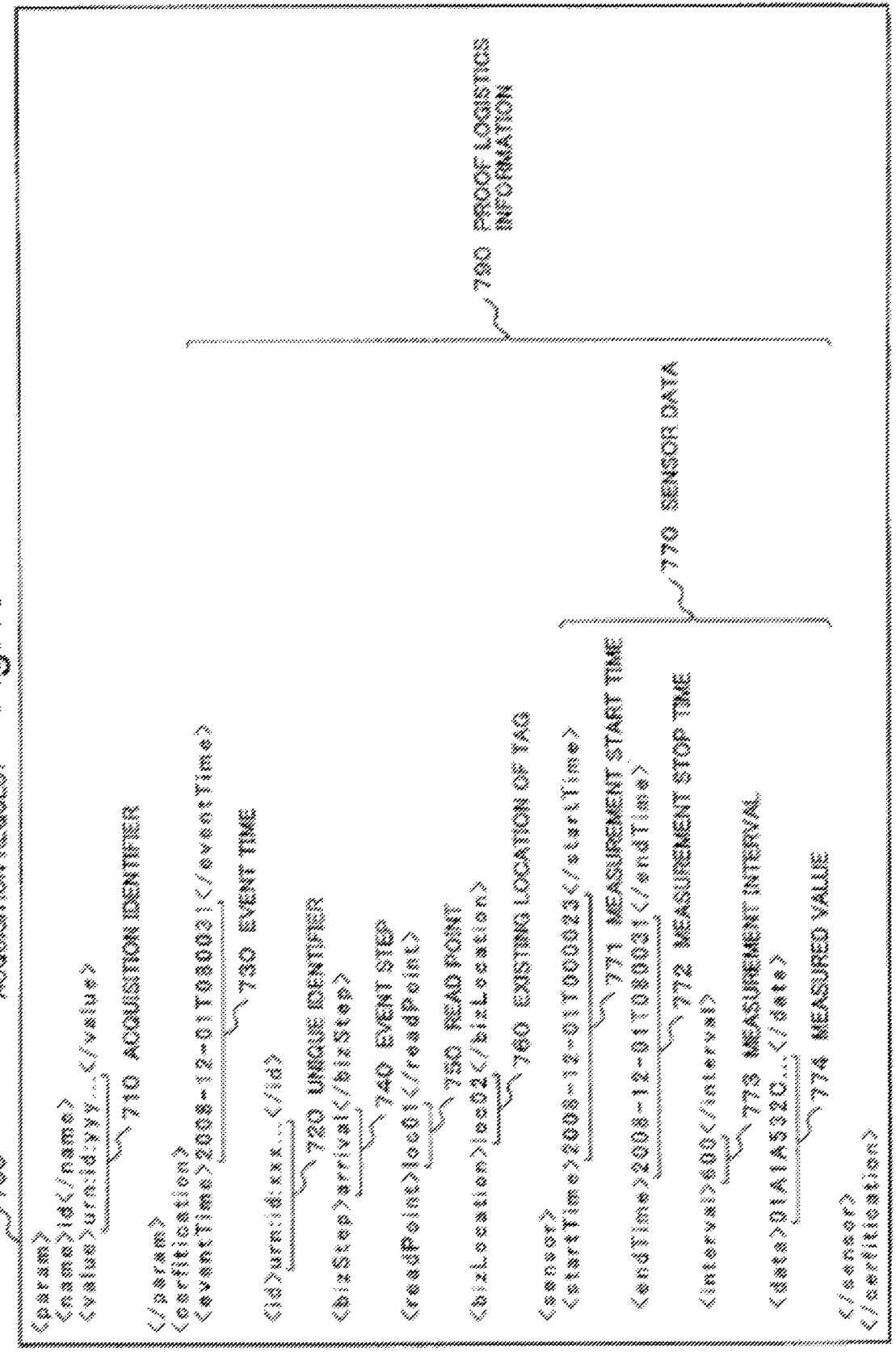

Fig.11

```
<param>
<name>id</name>
<value>urn:id:yyy...</value>          ~710 ACQUISITION IDENTIFIER
</param>
<certification>
<eventTime>2008-12-01T080031</eventTime>   ~730 EVENT TIME
<id>urn:id:xxx...</id>                ~720 UNIQUE IDENTIFIER
<bizStep>arrival</bizStep>            ~740 EVENT STEP
<readPoint>loc01</readPoint>          ~750 READ POINT
<bizLocation>loc02</bizLocation>      ~760 EXISTING LOCATION OF TAG
<sensor>
<startTime>2008-12-01T100023</startTime>   ~771 MEASUREMENT START TIME
<endTime>2008-12-01T080031</endTime>       ~772 MEASUREMENT STOP TIME
<sumData>e013ec2...</sumData>              ~775 IRREVERSIBLE SUMMARY INFORMATION
</sensor>
</certification>
```

700 CERTIFIED ACQUISITION REQUEST

770 SENSOR DATA

780 PROOF LOGISTICS INFORMATION

INFORMATION SHARING DEVICE, INFORMATION SHARING METHOD AND INFORMATION SHARING SYSTEM

TECHNICAL FIELD

The present invention relates to an information sharing device, an information sharing method and an information sharing system, and particularly relates to an information sharing device, an information sharing method and an information sharing system which perform access control to information.

BACKGROUND ART

In information management for goods which is represented by EPCIS (Electronic Product Codes Information Services) disclosed in the non-patent document 1, a data server managed by each enterprise collects logistics information such as storage information and delivery information. And further, in a system which shares these logistics information, access control to these logistics information is performed.

For example, one example of an access control system is disclosed in the patent document 1. The access control system of the patent document 1 manages dedicated information for judging the propriety of access in a policy storage means of a policy engine and an access control list storage means of an access control device.

Also, one example of a wireless tag system is disclosed in the patent document 2. The wireless tag system of the patent document 2 manages the dedicated information for judging the propriety of access in DB of an external storage device.

Also, one example of a retrieval method of a distribution history of products is disclosed in the patent document 3. The retrieval method of the distribution history of products of the patent document 3 has a configuration in which the products information with identifier, the dealer's information on a products distribution route and the trace data of a products route are stored in a database and mutually searched using the respective identifiers. By this, configuration, the retrieval method of the distribution history of products of the patent document 3 provides technology which enables tracking among the trace data.

Further, one example of a merchandise management system is disclosed in the patent document 4. The merchandise management system of the patent document 4 extracts the temperature data at the time when a target commercial product existed, based on an ID (IDentifier) of the commercial product and distribution data which are stored in a radio tag attached to the commercial product, from the temperature data of each of facilities in a distribution route of the commercial product which has been collected in a data server. Continuously, the merchandise management system of the patent document 4 creates the temperature historical data by merging.

Also, one example of a logistics management system is disclosed in the patent document 5. The logistics management system of the patent document 5 has a configuration which stores an identifier, a passing time and passing point information as one distribution event code in an RFID (Radio Frequency IDentification) tag attached to a logistics target product. Further, the logistics management system of the patent document 5 has a configuration in which a distribution event collecting server collects the distribution event codes, stores the collected amount, and provides on request. In this way, the logistics management system of the patent document 5 enables clients to acquire the history information.

Also, one example of a tracing system is disclosed in the patent document 6. The tracing system of the patent document 6 is using hash of information including tag ID (IDentification) for generation and verification of an authentication code for registration of distribution route information.

[Patent Document]

[Patent document 1] Japanese Patent Application Publication No. 2006-053824

[Patent document 2] Japanese Patent Application Publication No. 2006-185116

[Patent document 3] Japanese Patent Application Publication No. 2005-100325

[Patent document 4] Japanese Patent Application Publication No. 2004-299827

[Patent document 5] Japanese Patent Application Publication No. 2005-234628

[Patent document 6] Japanese Patent Application Publication No. 2008-265940

[Non-Patent Document]

[Non-patent document 1] EPCglobal Inc., The EPCglobal Architecture Framework Version 1.2, September, 2007 (http://www.epcglobalinc.org/standards/architecture/architecture_1_2-framework-20070910.pdf)

SUMMARY OF THE INVENTION

Problem to be Solved by the Invention

However, in the technologies disclosed in the documents mentioned above, there is a problem that they need a great burden of setting and management of access rules for access control.

For example, because logistics information such as the history of temperature, humidity and impact shock or the like during the logistics process collected by a sensor tag which is attached to goods is important data for the enterprise, it may not be disclosed for everyone.

Therefore, it is necessary for individual logistics information to set access rules for controlling the propriety of the disclosure to which enterprise is ok or not.

However, it becomes a great burden of setting the access rules for logistics information, whenever new logistics information is collected, for the user or the system which performs the setting.

Specifically, the reason why the burden becomes great in a case where the logistics information of specific goods is tried to be shared among a plurality of enterprises, which concern logistics of the goods, by using the technologies disclosed in the documents mentioned above will be described below. First, the system needs to manage a correspondence table of the logistics information and the identifier of enterprise (user) which is accessible to the logistics information as the information (access rules) which is used only for a purpose of judging the propriety of the access.

However, in general in the logistics business field, when considering one of enterprises which relates to logistics of certain goods, it is not always true that the enterprise knows all other enterprises relating to logistics of the goods. In many cases, the enterprise knows only other enterprises having a direct business relation with the enterprise.

For example, when a company A transports goods to a company X using a company B, it is considered that the company B entrusts actual transportation business to a company C and a company D. In this case, it can happen that the company A does not recognize necessarily that the transportation is entrusted to the company C and the company D from the company B, also that the company C and the company D do not know that the goods contracted for transportation belong to the company A.

Due to such characteristics of the logistics business field, it is not easy to obtain all identifiers of enterprises relating to logistics of the goods in advance, and it involves difficulties to set access rules.

That is, there is a great burden for a data server administrator in the system or method disclosed in the documents mentioned above in which the data server administrator creates and manages access rules apart from the information to be shared.

The object of the present invention is to provide an information sharing device, an information sharing method and an information sharing system which solve the problem mentioned above.

Means for Solving a Problem

An information sharing system of the present invention includes, an information collecting means;

a transportable type memory storage device which stores at least first information and second information;

a certified acquisition request creation means; and a certified acquisition request processing means, and wherein said information collecting means collects said first information and said second information from said transportable type memory storage device, wherein said certified acquisition request creation means transmits a certified acquisition request including proof information containing at least a part of said second information, and wherein said certified acquisition request processing means determines whether said first information is transmitted to a device equipped with the certified acquisition request creation means which is a transmission source of said certified acquisition request, based on an examination result whether said proof information included in said received certified acquisition request matches with any of parts of said first information.

An information sharing device of the present invention includes, an information collecting means which collects first information from a transportable type memory storage device; and a certified acquisition request processing means which, in a case where having received a certified acquisition request including proof information containing at least a part of second information which is information collected from said transportable type memory storage device, determines whether said first information is transmitted to a transmission source of said certified acquisition request, based on an examination result whether said proof information included in said received certified acquisition request matches with any of parts of said first information.

An information sharing method of the present invention includes, collecting first information from a transportable type memory storage device; and determining whether said first information is transmitted to a transmission source of a certified acquisition request, in a case where having received said certified acquisition request including proof information containing at least a part of second information which is information collected from said transportable type memory storage device, based on an examination result whether said proof information included in said received certified acquisition request matches with any of parts of said first information.

A program of the present invention causes a computer to execute processing of, collecting first information from a transportable type memory storage device; and determining whether said first information is transmitted to a transmission source of a certified acquisition request, in a case where having received said certified acquisition request including proof information containing at least a part of second information which is information collected from said transportable type memory storage device, based on an examination result whether said proof information included in said received certified acquisition request matches with any of parts of said first information.

Effect of the Invention

The effect of the present invention is that it becomes possible to reduce a burden of setting and management of access rules for the access control which shares logistics information of specific goods only among a plurality of data servers relating to logistics of the goods.

BRIEF DESCRIPTION OF THE DRAWINGS

FIG. 2 is a figure showing the structure of the logistics information of the first and fifth exemplary embodiments of the present invention.

FIG. 3 is a figure showing the structure of the certified acquisition request of the first and the fifth exemplary embodiments of the present invention.

FIG. 7 is a figure showing the structure of the logistics information of the second exemplary embodiment of the present invention.

FIG. 8 is a figure showing the structure of the certified acquisition request of the second exemplary embodiment of the present invention.

FIG. 9 is a figure showing the structure of the logistics information of the third and the fourth exemplary embodiments of the present invention.

FIG. 10 is a figure showing the structure of the certified acquisition request of the third exemplary embodiment of the present invention.

FIG. 11 is a figure showing the structure of the certified acquisition request of the fourth exemplary embodiment of the present invention.

EXEMPLARY EMBODIMENTS OF THE INVENTION

Next, the exemplary embodiments of the present invention will be described in detail with reference to drawings.

First Exemplary Embodiment

Figure 1:
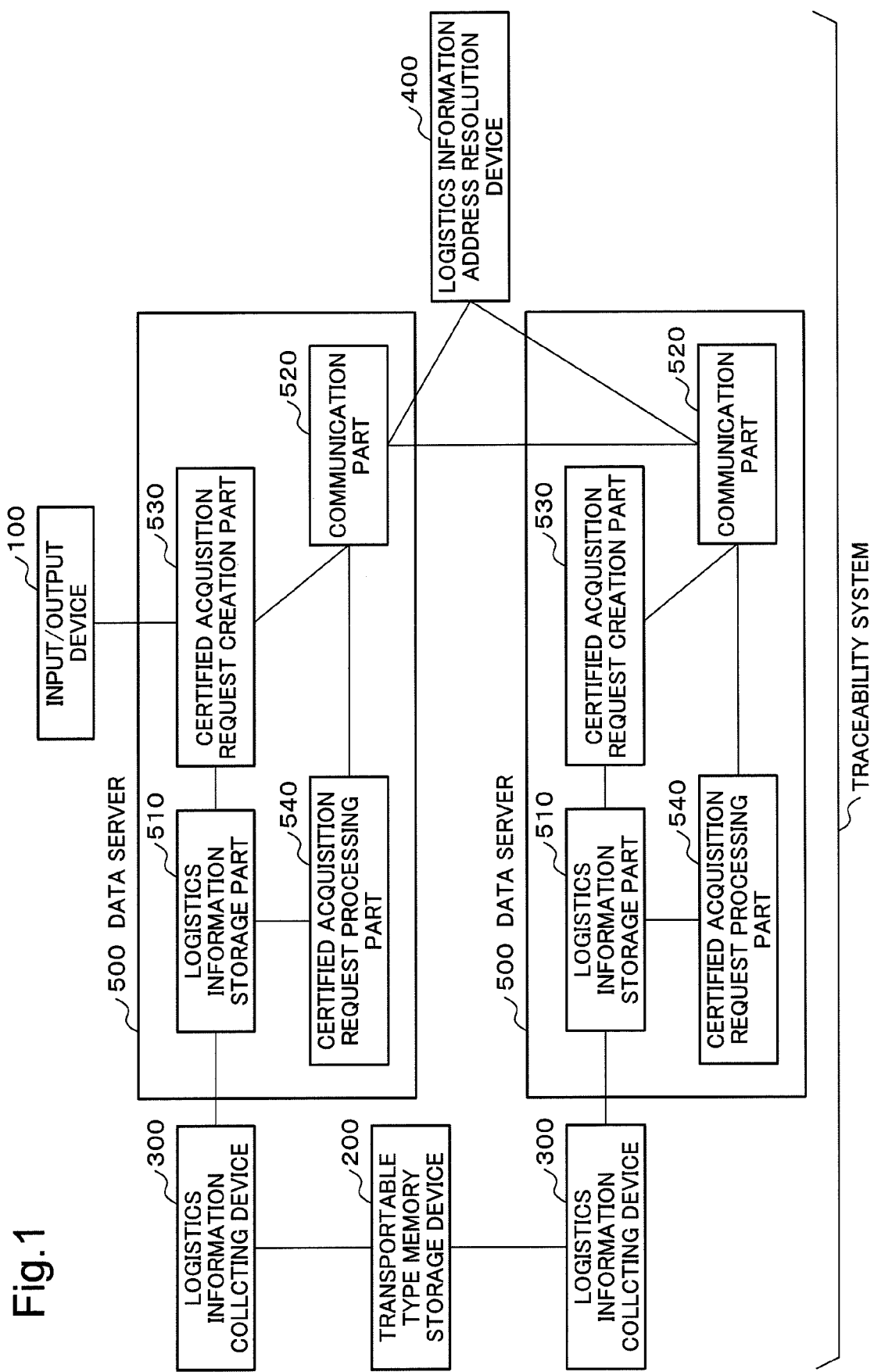
FIG. 1 is a block diagram showing the configuration of the first exemplary embodiment of the present invention.

Referring to FIG. 1, a traceability system according to the first exemplary embodiment of the present invention includes an input/output device 100, a transportable type memory storage device (it is also called a transportable storage device) 200, a logistics information collecting device (it is also called as an information collecting device) 300, a logistics information address resolution device 400 and a data server 500.

The logistics information address resolution device 400 and the data server 500 are connected via a network each other.

The input/output device 100 is realized by, for example, the input device such as a mouse and a keyboard connected to the data server 500, the output device such as a display, or a program which operates on a general server device equipped with CPU (Central Processing Unit), a memory and a hard disk device, a personal computer or a mobile terminal.

The input/output device 100 has a function, when the identifier of goods which specifies logistics information 600 (also called as second information and first information, and details will be described later) is inputted from the input device or the program, for transmitting an acquisition request including the identifier of goods to a certified acquisition request creation part 530. Moreover, the input/output device 100 has a function for receiving logistics information 600 from the certified acquisition request creation part 530 and displaying on the output device or executing a corresponding program.

The transportable type memory storage device 200 has a function for holding a unique identifier 620 which is an identifier for identifying oneself, a function for storing data, and a function for communicating with the logistics information collecting device 300 and logistics facilities (not shown). The transportable type memory storage device 200 is realized by, for example, an RFID tag or a mobile terminal. Also, the transportable type memory storage device 200 may be a tag with sensor and be also equipped with a function for collecting environmental information such as temperature, humidity or impact shock, or the like.

The transportable type memory storage device 200 stores, for example, logistics status information (for example, information of a step of event such as storage and delivery, a time when an event has occurred, etc.), a point where the logistics status information is received, location information of the transportable type memory storage device 200, and environmental information or the like as the contents which are corresponding to the logistics information 600. Further, the environmental information is that, for example, temperature information, humidity information or impact shock information collected by the transportable type memory storage device 200 itself or received from logistics facilities. Also, the transportable type memory storage device 200 transmits the contents, which are corresponding to the unique identifier 620 and the logistics information 600 being stored, to the logistics information collecting device 300.

The logistics information collecting device 300 (it is also called as the information collecting device) has a function for communicating with the transportable type memory storage device 200, and a function for communicating with the data server 500. The logistics information collecting device 300 is realized by, for example, a device such as an RFID reader which exchanges information with an RFID tag. Or, the logistics information collecting device 300 is realized by a combination of a general server device, which is connecting such a device and equipped with CPU, a memory and a hard disk device or the like, or a personal computer and a program such as the RFID middleware which processes data collected by the device. It may also configure that, for example, the data server 500 is connected with such a device and is loaded with the RFID middleware.

The logistics information collecting device 300 has a function for collecting information of a unique identifier 620 or the like from the transportable type memory storage device 200. Further, the logistics information collecting device 300 has a function for creating logistics information 600 including at least the unique identifier 620 from the information having been collected. Further, the logistics information collecting device 300 has a function for sending the created logistics information 600 to a logistics information storage part 510 of the data server 500.

As shown in FIG. 2, the logistics information 600 may include at least a unique identifier 620, and may further include more than one among an event time 630, an event step 640, a read point 650 and an existing location of tag 660. Further, "<" and ">" and the character string intervening between these is delimiter (hereinafter, same in other figures). The event time 630 is, for example, information of the time when an event has occurred and is also called as information occurring time. Also, the event step 640 is, for example, information relating to storage and delivery or the like. Also, the read point 650 is, for example, information of the place where logistics status information is received, and the existing location of tag 660 is, for example, information of the location of the transportable type memory storage device 200. Further, the logistics information 600 may include more than one of history information of a plurality of environmental information (for example, temperature information, humidity information or impact shock information) in the logistics process.

The logistics information address resolution device 400 may also be a general server device or a personal computer, which has a program using technology for performing address resolution such as ONS (Object Name Service) and P2P (Peer to Peer) or the like, or has the functions like these. Or, it may configure that the data server 500 includes the logistics information address resolution device 400 by loading the program on the data server 500.

The logistics information address resolution device 400 has a function for receiving a certified acquisition request 700 (details will be described later) from the certified acquisition request creation part 530. Further, the logistics information address resolution device 400 has a function for transmitting the received certified acquisition request 700 to a certified acquisition request processing part 540 of the data server 500 equipped with a logistics information storage part 510 which holds the logistics information 600 corresponding to an acquisition identifier 710 included in the certified acquisition request 700. Further, the acquisition identifier 710 is the identifier which is correlated with an identifier of goods by the certified acquisition request creation part 530 which will be described later.

The data server 500 includes a logistics information storage part 510, a certified acquisition request creation part 530, a certified acquisition request processing part 540 and a communication part 520.

The logistics information storage part 510 stores at least one logistics information 600 received from the logistics information collecting device 300. Also, the logistics information storage part 510 provides the logistics information 600 on request from the certified acquisition request creation part 530 or the certified acquisition request processing part 540.

The communication part 520 has a function for sending and receiving data using a network such as the internet and LAN (Local Area Network) or the like.

Transmission and reception of a certified acquisition request 700 and logistics information 600 among the certified acquisition request creation part 530, the certified acquisition request processing part 540 and the logistics information address resolution device 400 are realized via this communication part 520. Further, in the following description, the description relating to the communication performing via the communication part 520 is omitted.

The certified acquisition request creation part 530 has a function for receiving an acquisition request from the input/output device 100, and a function for requesting the logistics information 600 corresponding to the identifier of goods included in the acquisition request to the logistics information storage part 510, and acquiring the logistics information 600. Further, the certified acquisition request creation part 530 has a function for creating proof logistics information (it is also called as proof information) 790 from the acquired logistics information 600. Further, the certified acquisition request creation part 530 has a function for treating the identifier of goods included in the acquisition request as an acquisition identifier 710, and creating the certified acquisition request 700 as shown in FIG. 3 including this acquisition identifier 710 and the proof logistics information 790. Further, the certified acquisition request creation part 530 has a function for transmitting the created certified acquisition request 700 to the logistics information address resolution device 400 and a function for receiving the logistics information 600 which is response to the certified acquisition request 700.

The certified acquisition request processing part 540 has a function for receiving a certified acquisition request 700 from the logistics information address resolution device 400. Moreover, the certified acquisition request processing part 540 has a function for requesting the logistics information 600 corresponding to the acquisition identifier 710 included in the certified acquisition request 700 to the logistics information storage part 510, and acquiring the logistics information 600. Moreover, the certified acquisition request processing part 540 has a function for comparing the contents of the acquired logistics information 600 (for example, a unique identifier 620) and the contents of the proof logistics information 790 (for example, a unique identifier 720) included in the certified acquisition request 700. Moreover, the certified acquisition request processing part 540 has a function for judging whether access is acceptable or not to the acquired logistics information 600 based on the compared result. Moreover, the certified acquisition request processing part 540 has a function, when having determined the access is acceptable, for transmitting the acquired logistics information 600 to the data server 500 of the transmission source of the certified acquisition request 700.

Next, operation of this exemplary embodiment will be described in detail with reference to FIGS. 1-6.

Figure 4:
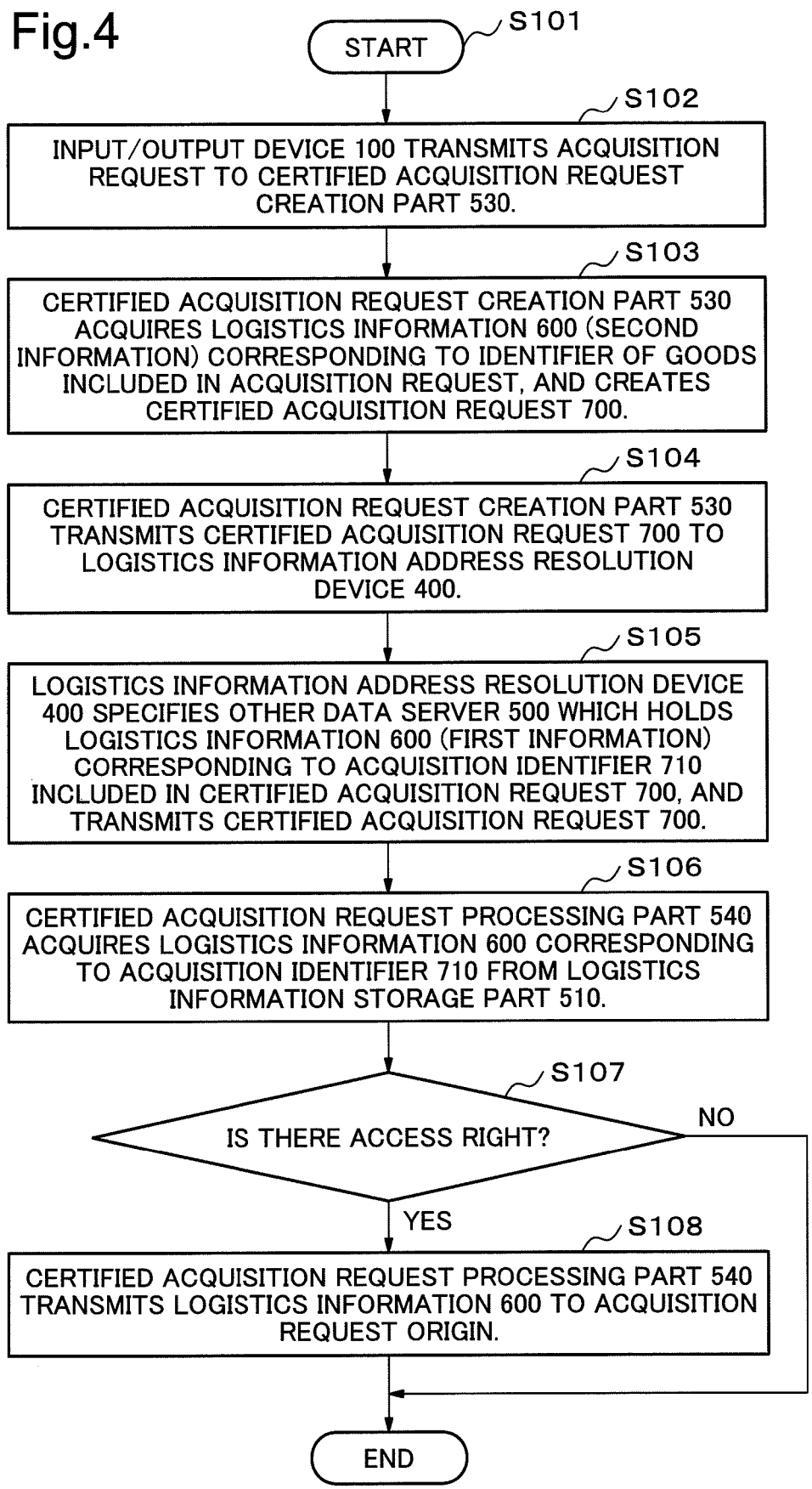
FIG. 4 is a flowchart showing a series of operation of the first to the fourth exemplary embodiments of the present invention.

First, whole operation of the traceability system including all devices will be described. FIG. 4 is a flowchart showing a series of operation of the data server 500 for acquiring logistics information 600 from other data server 500.

First, operation is started by an operator who inputs an acquisition request including an identifier of goods from the input/output device 100 (S101).

The input/output device 100 transmits the acquisition request to the certified acquisition request creation part 530 of the data server 500 (S102).

Next, the certified acquisition request creation part 530 requests the logistics information 600 (the second information) corresponding to the identifier of goods included in the acquisition request received from the input/output device 100 to the logistics information storage part 510 of own data server 500, and acquires it. And then, the certified acquisition request creation part 530 treats the identifier of goods included in the acquisition request as an acquisition identifier 710, and creates a certified acquisition request 700 including proof logistics information 790 (including a part of the second information) created from the acquisition identifier 710 and the acquired logistics information 600 (S103).

Further, in S103, when the logistics information 600 corresponding to the acquisition identifier 710 does not exist in the logistics information storage part 510 of own data server 500, the certified acquisition request creation part 530 may create a certified acquisition request 700 which does not include the proof logistics information 790. Or, the certified acquisition request creation part 530 may finish the acquisition operation of logistics information 600 on other data server 500 without creating a certified acquisition request 700.

Continuously, the certified acquisition request creation part 530 transmits a certified acquisition request 700 to the logistics information address resolution device 400 (S104). Further, in the following description, the data server 500 of certified acquisition request creation part 530 which has transmitted the certified acquisition request 700 is called as an acquisition request origin (it is also called as a transmission source of certified acquisition request).

Next, the logistics information address resolution device 400 specifies other data server 500 which holds the logistics information 600 (the first information) corresponding to the acquisition identifier 710 included in the certified acquisition request 700, and transmits the certified acquisition request 700 to the data server 500 (S105).

Next, the certified acquisition request processing part 540 of other data server 500, which has received the certified acquisition request 700 from the logistics information address resolution device 400, acquires the logistics information 600 corresponding to the acquisition identifier 710 included in the certified acquisition request 700 from the logistics information storage part 510 (S106).

Continuously, the certified acquisition request processing part 540 determines whether there is an access right of acquisition request origin to this acquired logistics information 600 based on the logistics information 600 (the first information) acquired from the logistics information storage part 510 and the proof logistics information 790 (including a part of the second information) included in the certified acquisition request 700 (S107). When determining there is the access right (in S107, YES), the certified acquisition request processing part 540 transmits the logistics information 600 acquired from the logistics information storage part 510 to the acquisition request origin (S108). When determining there is no access right (in S107, NO), it does not transmit the logistics information 600 to the acquisition request origin, and processing is ended.

Further, the case where it is determined there is no access right is a case where the proof logistics information 790 is not included in the certified acquisition request 700, or a case where it is judged that the proof logistics information 790 is fabricated. Also, the judgment of fabrication is carried out by comparing at least one pair of information included in the acquired logistics information 600 and the proof logistics information 790, i.e., the unique identifier 620, the event time 630, the event step 640, the read point 650 and the existing location of tag 660 which are included in the acquired logistics information 600 and respectively corresponding the unique identifier 720, the event time 730, the event step 740, the read point 750 and the existing location of tag 760 which are included in the proof logistics information 790.

Processing executed in a series of operation in which the data server 500 acquires logistics information 600 from other data server 500 in the traceability system of this exemplary embodiment mentioned above can be divided into mainly the request processing which creates and transmits a certified acquisition request 700 and the reply processing which processes the received certified acquisition request 700.

Accordingly, next, operation of the request processing which creates and transmits a certified acquisition request 700 of this exemplary embodiment will be described more in detail. FIG. 4 is a flowchart showing operation of the request processing in this exemplary embodiment.

The certified acquisition request creation part 530 receives an acquisition request including an identifier of goods from the input/output device 100 (S201).

Continuously, the certified acquisition request creation part 530 requests logistics information 600 to the logistics information storage part 510 based on the identifier of goods included in the acquisition request (S202).

Next, the logistics information storage part 510 searches for the logistics information 600 including the identifier of goods which is included in the acquisition request from the logistics information 600 being held, and when existing, the logistics information storage part 510 returns the logistics information 600 which has been searched for to the certified acquisition request creation part 530. Also, when not existing, the logistics information storage part 510 returns error information or empty logistics information 600 to the certified acquisition request creation part 530 (S203).

Next, the certified acquisition request creation part 530 determines whether information acquired from the logistics information storage part 510 is expected logistics information 600 (S204), and when it is the logistics information 600 (in S204, YES), processing advances to S205. When it is an error (in S204, NO), processing is ended.

In S205, the certified acquisition request creation part 530 creates proof logistics information 790 based on the logistics information 600 received in S203 (S205). In an example of this exemplary embodiment, the unique identifier 620 "urn:id:xxx . . . ", the event time 630 "2008-12-01T080031", the event step 640 "arrival", the read point 650 "loc01" and the existing location of tag 660 "loc02" included in the logistics information 600 as shown in FIG. 2 are made to the proof logistics information 790 which includes respective the unique identifier 720 "urn:id:xxx . . . ", the event time 730 "2008-12-01T080031", the event step 740 "arrival", the read point 750 "loc01" and the existing location of tag 760 "loc02" as shown in FIG. 3.

Continuously, the certified acquisition request creation part 530 treats the identifier of goods included in the acquisition request received in S201 as an acquisition identifier 710, and creates the certified acquisition request 700 including this and the proof logistics information 790 created in S205 (S206).

Continuously, the certified acquisition request creation part 530 transmits a certified acquisition request 700 to the logistics information address resolution device 400 (S207).

Continuously, the certified acquisition request creation part 530 gets in a state of waiting for reception, and waits for a response to the certified acquisition request 700 from other data server 500 (S208). And, when the response is received (in S208, YES), processing advances to S209. Also, in a case where the response is not received even if a predetermined time period has passed (in S208, NO), processing is ended.

In S209, the certified acquisition request creation part 530 outputs the logistics information 600 which is a response from other data server 500 received in S208 or error to the input/output device 100.

As it has been described above, by operation from S201 to S208, the certified acquisition request creation part 530 creates and transmits a certified acquisition request 700 including the logistics information 600 corresponding to the acquisition identifier 710 of own data server 500. And, by operation from S209 to S210, the certified acquisition request creation part 530 receives a response to the acquisition request 700 with said proof from other data server 500.

Figure 6:
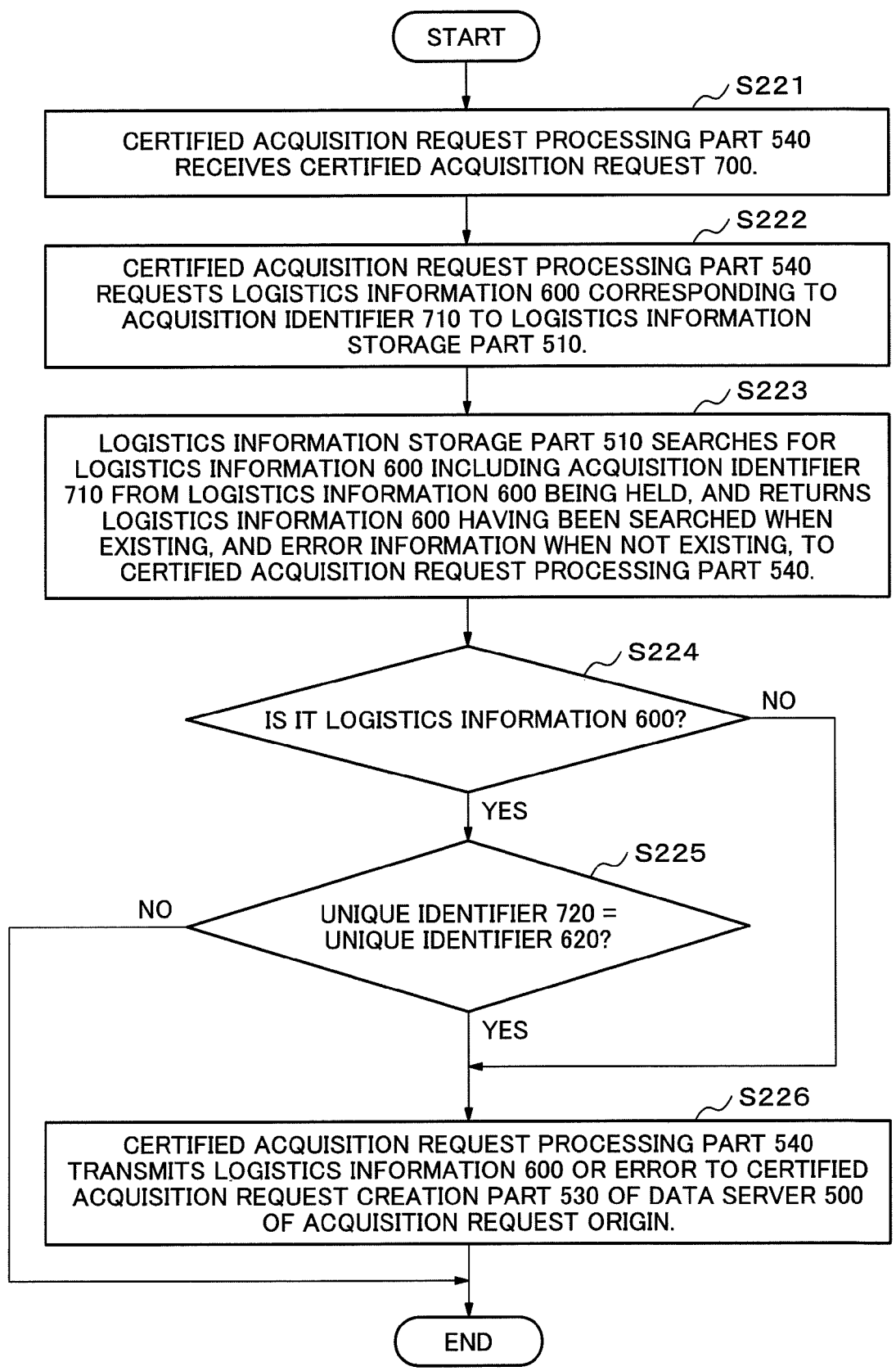
FIG. 6 is a flowchart showing operation of reply processing of the first to the fourth exemplary embodiments of the present invention.

Next, operation of the response processing to process a certified acquisition request 700 of this exemplary embodiment will be described more in detail. FIG. 6 is a flowchart showing operation of the response processing in this exemplary embodiment.

The certified acquisition request processing part 540 receives a certified acquisition request 700 from the logistics information address resolution device 400 (S221).

Continuously, the certified acquisition request processing part 540 extracts the acquisition identifier 710 from the received certified acquisition request 700 and requests the logistics information 600 corresponding to this acquisition identifier 710 to the logistics information storage part 510 (S222).

Next, the logistics information storage part 510 searches for the logistics information 600 including the acquisition identifier 710 from the logistics information 600 being held, and returns the searched logistics information 600 when existing, and error information when not existing, to the certified acquisition request processing part 540 (S223).

Next, the certified acquisition request processing part 540 determines whether information received from the logistics information storage part 510 is logistics information 600 or an error (S224), and processing advances to S225 when it is the logistics information 600 (in S224, YES). Also, when it is an error (in S224, NO), processing advances to S226.

Next, the certified acquisition request processing part 540 extracts the unique identifier 720 from the proof logistics information 790 included in the certified acquisition request 700, extracts the unique identifier 620 from the logistics information 600 acquired in S223, and compares these (S225). And, when the unique identifier 620 and the unique identifier 720 are identical (in S225, YES), the certified acquisition request processing part 540 determines that the acquisition request origin has an access right to this acquired logistics information 600, and processing advances to S226. When they are not identical (in S225, NO), the certified acquisition request processing part 540 determines that the acquisition request origin does not have an access right to this acquired logistics information 600, and processing is ended.

In S226, the certified acquisition request processing part 540 transmits the information (that is, logistics information 600 or error) acquired from the logistics information storage part 510 in S223 to the certified acquisition request creation part 530 of the data server 500 of acquisition request origin (S226).

As it has been described above, the certified acquisition request processing part 540 determines whether the unique identifier 720 (id) of the proof logistics information 790 (certification) which is included in the certified acquisition request 700 created by the certified acquisition request creation part 530 in S205 matches with the unique identifier 620 of the logistics information 600 acquired in 223, and judges that there is an access right when matching.

Further, in this exemplary embodiment, an example of the configuration has been shown that transmission and reception of a certified acquisition request 700 between the certified acquisition request creation part 530 and the certified acquisition request processing part 540 was performed via the logistics information address resolution device 400. As the other example, it may configure that the certified acquisition request creation part 530 and the certified acquisition request processing part 540 perform direct transmission and reception without passing through the logistics information address resolution device 400 when the address of the destination data server 500 is known by the data server 500 which is a transmission source. And, in this case, the logistics information address resolution device 400 does not have to be included in the configuration.

The first effect in this exemplary embodiment mentioned above is a point that when the logistics information 600 of specific goods is shared only among a plurality of data servers 500 relating to logistics of these goods, a burden of setting and management of access rules which perform access control for it can be reduced.

The reason is because it configures so that an access right among each data server 500 may be judged with the logistics information 600 stored in each data server 500 as proof information.

The second effect in this exemplary embodiment mentioned above is a point that when the logistics information 600 of specific goods is shared only among a plurality of data servers 500 relating to logistics of these goods, a burden of setting and management of access rules which perform access control for it can be further reduced.

The reason is because it configures so that a physical ID of an RFID may be used as a unique identifier 620 of the logistics information 600.

The third effect in this exemplary embodiment mentioned above is a point that it can enable to prevent increase in consumption of physical resources due to increase in access rules and decline of the access control processing speed.

The reason is because it configures so that an access right among each data server 500 may be judged with only the logistics information 600 stored in each data server 500 as proof information. That is, thus, because it is configured like this, the data server 500 does not need to manage other than the logistics information 600, also not need to perform the rule match processing.

The fourth effect in this exemplary embodiment mentioned above is a point that it can enable to share the logistics information 600 of specific goods only among a plurality of data servers 500 relating to logistics of these goods without setting a permission range of access beforehand.

The reason is because it configures so that an access right among each data server 500 may be judged with the logistics information 600 stored in each data server 500, not a user identifier, as proof information.

For example, a matter of judging, that there is an access right by matching a unique identifier 620 of the logistics information 600 with a unique identifier 720 of the proof logistics information 790, is equivalent to a matter of regarding that, by the fact that the data server 500 of acquisition request origin is holding the logistics information 600 by which the proof logistics information 790 including the unique identifier 720 can be created, it shows that the data server 500 of acquisition request origin is the data server 500 relating to the logistics of goods of the logistics information 600.

In this way, this exemplary embodiment judges whether, for example, the data server 500 of acquisition request origin is the data server 500 relating to the logistics of goods indicated by the acquisition identifier 710, and it makes it possible to access to the logistics information 600 only by the data server 500 of an enterprise relating to the logistics.

Thus, by using logistics information 600 for access control, this exemplary embodiment realizes the access control which enables to share the logistics information 600 of specific goods only among a plurality of data servers 500 relating to the logistics of goods, without using a user identifier which indicates an access user and without setting access rules for each logistics information 600.

Second Exemplary Embodiment

Next, a traceability system according to the second exemplary embodiment of the present invention will be described in detail with reference to drawings.

The traceability system according to the second exemplary embodiment of the present invention is different, compared with the first exemplary embodiment, in the structure of the logistics information 600, operation of creating the proof logistics information 790 and operation of comparing the received certified acquisition request 700 with the logistics information 600.

As shown in FIG. 7, the logistics information 600 of the second exemplary embodiment of the present invention has the structure that includes at least a unique identifier 720, an event time 630 and sensor data 670. Further, the sensor data 670 at least includes at least a measurement start time 671 and a measurement stop time 672.

Figure 5:
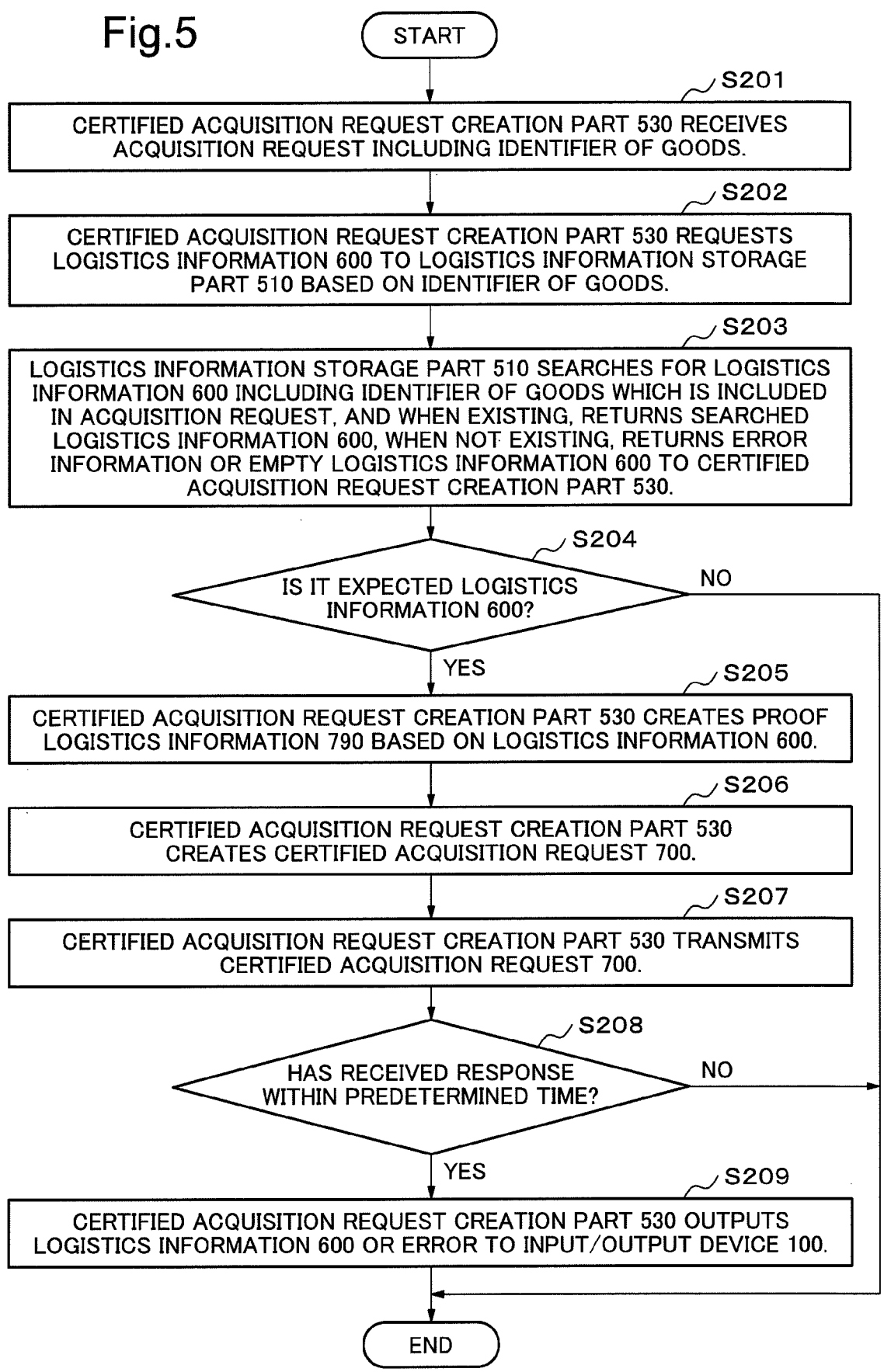
FIG. 5 is a flowchart showing operation of request processing of the first to the fourth exemplary embodiments of the present invention.

In operation of the second exemplary embodiment of the present invention, step S205 of FIG. 5 and step S225 of FIG. 6 which show operation of the first exemplary embodiment can be replaced by S305 and S425 shown below respectively.

In S305, the certified acquisition request creation part 530 creates proof logistics information 790 based on the logistics information 600 received in S203 (S305). In an example of this exemplary embodiment, based on the logistics information 600 as shown in FIG. 7, which includes the unique identifier 620 "urn:id:xxx . . . ", the event time 630 "2008-12-01T080031", the event step 640 "arrival", the read point 650 "loc01", the existing location of tag 660 "loc02", the measurement start time 671 "2008-12-01T000023" and the measurement stop time 672 "2008-12-01T080031", the proof logistics information 790 as shown in FIG. 8, which respectively includes the unique identifier 720 "urn:id:xxx . . . ", the event time 730 "2008-12-01T080031", the event step 740 "arrival", the read point 750 "loc01", the existing location of tag 760 "loc02", the measurement start time 771 "2008-12-01T000023" and the measurement stop time 772 "2008-12-01T080031", is created.

In S425, the certified acquisition request processing part 540 extracts the unique identifier 720 and the event time 730 from the proof logistics information 790 included in the certified acquisition request 700. Continuously, the certified acquisition request processing part 540 extracts the unique identifier 620, the measurement start time 671 and the measurement stop time 672 from the logistics information 600 acquired in S223. Further continuously, the certified acquisition request processing part 540 compares the unique identifier 720 and the event time 730 with the unique identifier 620, the measurement start time 671 and the measurement stop time 672 (S425). When the unique identifier 620 and the unique identifier 720 are identical, and the event time 730 is equivalent to the time between the measurement start time 671 and the measurement stop time 672 of the sensor data 670 of the logistics information 600 obtained in S223 (in S425, YES), the certified acquisition request processing part 540 determines that the acquisition request origin has an access right to this acquired logistics information 600, and processing advances to S226.

When the unique identifier 620 and the unique identifier 720 are not identical, or the event time 730 is not equivalent to the time between the measurement start time 671 and the measurement stop time 672 of the sensor data 670 of the logistics information 600 obtained in S223 (in S425, NO), the certified acquisition request processing part 540 judges that there is no access right to this acquired logistics information 600 in the acquisition request origin, and processing is ended.

The effect in this exemplary embodiment mentioned above is a point that it can enable to judge an access right more strictly in addition to the effect of the first exemplary embodiment.

The reason is because it is configured so that an access right may be determined by using an event time 730 together with a unique identifier 720.

The effect of this exemplary embodiment is also useful when an RFID tag is re-used.

Because, in a case where a physical identifier of RFID is used as a unique identifier 720, when an RFID tag is re-used, such a problem occurs that the same unique identifier 620 is assigned to different logistics information 600 for more than two goods. And, in the traceability system by the form of the first exemplary embodiment, there is a possibility to judge that there is an access right even if it is the logistics information 600 for which the proof logistics information 790 is different use occasion, because it cannot distinguish different logistics information 600 for more than two goods when such problem occurs.

By introducing this exemplary embodiment, it is possible to determine whether the data server 500 of acquisition request origin has related to the logistics corresponding to the logistics information 600 during the time from the measurement start time 671 to the measurement stop time 672 which are included in the logistics information 600 of the acquisition object. Accordingly, it can judge that there is no access right for the data server 500 of acquisition request origin when it is the logistics information 600 for which the proof logistics information 790 is different use occasion.

When an RFID tag is re-used and attached on more than two different goods, the logistics information storage part 510 does not hold information for distinguishing these goods directly. However, by introducing the form of the second exemplary embodiment, it is realized that only a data server 500 relating to the logistics of specific goods can access the logistics information 600.

Third Exemplary Embodiment

Next, a traceability system according to the third exemplary embodiment of the present invention will be described in detail with reference to drawings.

Comparing with the first exemplary embodiment, the traceability system according to the third exemplary embodiment of the present invention is different in the structure of logistics information 600 and proof logistics information 790, operation for creating the proof logistics information 790 and operation for comparing the received certified acquisition request 700 with the logistics information 600.

As shown in FIG. 9, the logistics information 600 of the third exemplary embodiment of the present invention has the structure that includes at least a unique identifier 620, an event time 630 and sensor data 670. Further, the sensor data 670 includes at least a measurement start time 671, a measurement stop time 672, a measurement interval 673 and a measured value 674. The measured value 674 is a set of the information which the transportable type memory storage device 200 has acquired as environmental data from logistics facilities for each measurement interval 673 from the measurement start time 671. Accordingly, the certified acquisition request processing part 540 can calculate the measurement time of each environmental data included in the measured value 674 based on the measurement start time 671, the measurement interval 673 and the measured value 674.

In operation of the third exemplary embodiment of the present invention, step S205 of FIG. 5 and step S225 of FIG. 6 which show operation of the first exemplary embodiment can be replaced by S505 and S625 shown below respectively.

In S505, the certified acquisition request creation part 530 creates proof logistics information 790 based on the logistics information 600 received in S203 (S505). In an example of this exemplary embodiment, based on the logistics information 600 as shown in FIG. 9, which includes the unique identifier 620 "urn:id:xxx . . . ", the event time 630 "2008-12-01T080031", the event step 640 "arrival", the read point 650 "loc01", the existing location of tag 660 "loc02", the measurement start time 671 "2008-12-01T000023" and the measurement stop time 672 "2008-12-01T080031", the measurement interval 673 "600" and the measured value 674 "0A1A532C . . . ", the proof logistics information 790 as shown in FIG. 10, which respectively includes the unique identifier 720 "urn:id:xxx . . . ", the event time 730 "2008-12-01T080031", the event step 740 "arrival", the read point 750 "loc01", the existing location of tag 760 "loc02", the measurement start time 771 "2008-12-01T000023" and the measurement stop time 772 "2008-12-01T080031", the measurement interval 773 "600" and the measured value 774 "0A1A532C . . . ", is created.

Accordingly, in the certified acquisition request 700 of the third exemplary embodiment of the present invention, the sensor data 770 which includes at least the measurement start time 771, the measurement stop time 772, the measurement interval 773 and the measured value 774 is added as the proof logistics information 790 comparing with the certified acquisition request 700 of the first exemplary embodiment.

In S625, the certified acquisition request processing part 540 extracts the unique identifier 720 and the sensor data 770 from the proof logistics information 790 included in the certified acquisition request 700. Continuously, the certified acquisition request processing part 540 extracts the unique identifier 620 and the sensor data 670 from the logistics information 600 acquired in S223. Further continuously, the certified acquisition request processing part 540 compares the unique identifier 720 and the sensor data 770 with the unique identifier 620 and the sensor data 670 (S625). When the unique identifier 620 and the unique identifier 720 are identical, and the contents of the set of all environmental data included in the measured value 774 and its measurement time match with the set of environmental data included in the measured value 674 of the logistics information 600 obtained in S223 and its measurement time (in S625, YES), the certified acquisition request processing part 540 determines that the acquisition request origin has an access right to this acquired logistics information 600, and processing advances to S226. Also, when the unique identifier 620 and the unique identifier 720 are not identical, or at least one among the contents of the set of the environmental data included in the measured value 774 and its measurement time does not match with any one of the set of the environmental data included in the measured value 674 of the logistics information 600 obtained in S223 and the measurement time (in S625, NO), the certified acquisition request processing part 540 judges that there is no access right to this acquired logistics information 600 in the acquisition request origin, and processing is ended.

The first effect in this exemplary embodiment mentioned above is a point that it can enable to judge an access right more strictly in addition to the effect of the first exemplary embodiment.

The reason is because it is configured so that an access right may be determined by using the sensor data 770 together with a unique identifier 720.

The effect of this exemplary embodiment is also effective even when a malicious user tries to create the logistics information 600 which will become the proof logistics information 790.

That is, according to the first and the second exemplary embodiment, there is a possibility that the malicious user may fabricate the sensor data 670 in which time is only right, and acquire an access right.

According to this embodiment, the certified acquisition request processing part 540 is performing judgment of whether the data server 500 of acquisition request origin is the data server 500 which relates to logistics of goods indicated by the acquisition identifier 710 by checking of the sensor data 670.

If the data server 500 of acquisition request origin is the data server 500 which relates to the logistics of goods indicated by the acquisition identifier 710, this data server 500 collects data by the logistics information collecting device 300 when the transportable type memory storage device 200 is passing through this data server 500. Accordingly, this data server 500 has the logistics information 600 which is in complete accord with a part of the measured value 674 included in the acquisition target logistics information 600. Accordingly, the data server 500 which relates to the logistics of goods indicated by the acquisition identifier 710 can create the proof logistics information 790 based on this. On the other hand, it is difficult for the malicious user to create the proof logistics information 790 which is in complete accord with a part of the measured value 674 included in the acquisition target logistics information 600.

In this way, this exemplary embodiment prevents fabrication of proof logistics information 790 by the malicious user, and realizes that only the data server 500 relating to the logistics of specific goods can access to the corresponding logistics information 600.

Next, a traceability system according to the fourth exemplary embodiment of the present invention will be described in detail with reference to drawings.

Comparing with the third exemplary embodiment, the traceability system according to the fourth exemplary embodiment of the present invention is different in the structure of proof logistics information 790, operation for creating the proof logistics information 790 and operation for comparing the received certified acquisition request 700 with the logistics information 600.

The traceability system according to the third exemplary embodiment of the present invention has used the measurement start time 671, the measurement stop time 672, the measurement interval 673 and the measured value 674 acquired from the logistics information storage part 510 just as it is, as the sensor data 670 to be included in the proof logistics information 790 of the certified acquisition request 700 which the certified acquisition request creation part 530 creates. However, the traceability system according to this exemplary embodiment uses irreversible summary information 775 which is obtained by performing specific calculation to the measurement interval 673 and the measured value 674 and converting.

For example, this specific calculation can be realized using one-way hash function.

In operation of the fourth exemplary embodiment of the present invention, step S505 and step S625 in the operation of the third exemplary embodiment can be replaced by S705 and S825 shown below respectively.

In S705, the certified acquisition request creation part 530 creates proof logistics information 790 based on the logistics information 600 received in S203 (S705). In an example of this exemplary embodiment, the proof logistics information 790 as shown in FIG. 11, which includes the sensor data 770 including the unique identifier 720 "urn:id:xxx . . . ", the event time 730 "2008-12-01T080031", the event step 740 "arrival", the read point 750 "loc01", the existing location of tag 760 "loc02", the measurement start time 771 "2008-12-01T000023", the measurement stop time 772 "2008-12-01T080031" and the irreversible summary information 775 "e013ac2 . . . ", is created based on the unique identifier 620 "urn:id:xxx . . . ", the event time 630 "2008-12-01T080031", the event step 640 "arrival", the read point 650 "loc01", the existing location of tag 660 "loc02", the measurement start time 671 "2008-12-01T000023", the measurement stop time 672 "2008-12-01T080031", the measurement interval 673 "600" and the measured value 674 "0A1A532C . . . " which are included in the logistics information 600 as shown in FIG. 9.

In S825, the certified acquisition request processing part 540 extracts the unique identifier 720 and the sensor data 770 from the proof logistics information 790 included in the certified acquisition request 700, and extracts the unique identifier 620 and the sensor data 670 from the logistics information 600 acquired in S223. Continuously, the certified acquisition request processing part 540 extracts the measured value 674 which is corresponding to the time from the measurement start time 771 to the measurement stop time 772. Further continuously, the certified acquisition request processing part 540 performs the same specific calculation as the case of creating the irreversible summary information 775 in S705 to these, and creates the irreversible summary information 675 (not shown). Further continuously, the certified acquisition request processing part 540 compares the unique identifier 720 and the irreversible summary information 775 with the unique identifier 620 and the irreversible summary information 675 (S825). When the unique identifier 620 and the unique identifier 720 are identical and the irreversible summary information 675 and the irreversible summary information 775 are identical (in S825, YES), the certified acquisition request processing part 540 determines that the acquisition request origin has an access right to this acquired logistics information 600, and processing advances to S226. When the unique identifier 620 and the unique identifier 720 are not identical or the irreversible summary information 675 and the irreversible summary information 775 are not identical (in S825, NO), the certified acquisition request processing part 540 judges that the acquisition request origin does not have an access right to this acquired logistics information 600, and processing is ended.

The first effect in this exemplary embodiment mentioned above is a point that it can increase the security of logistics information 600 in addition to the effect of the third exemplary embodiment.

The reason is because it is configured so that the logistics information 600 which is a target of access control may be converted into the irreversible summary information 775, and may use it as information for making decision of an access right existence.

In case of the third exemplary embodiment, special protection is not treated to a certified acquisition request 700. Accordingly, for example, a matter that a certified acquisition request 700 is brought to be known by a data server 500 which does not relate to the logistics of goods of the acquisition identifier 710 is directly linked to a matter that sensor data 670 included in the proof logistics information 790 becomes to be exposed.

According to this exemplary embodiment, the measured value 674 of the sensor data 670 included in the certified acquisition request 700 is converted into the irreversible summary information 775. Accordingly, it is possible to prevent an actual measured value 674 being known by a data server 500 which does not relate to the logistics of goods of the acquisition identifier 710.

The second effect in this exemplary embodiment mentioned above is a point that data size of the certified acquisition request 700 can be reduced.

The reason is because it is configured so that the logistics information 600 which is the information for making decision of an access right existence may be converted with compression to the irreversible summary information 775 and used.

Next, the fifth exemplary embodiment of the present invention will be described in detail using a drawing.

Figure 12:
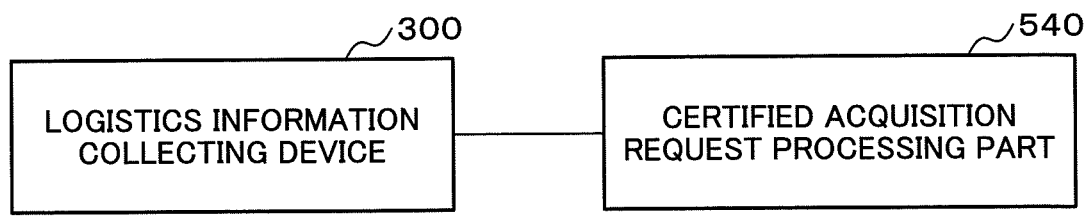
FIG. 12 is a block diagram showing the configuration of the fifth exemplary embodiment of the present invention.

This exemplary embodiment is the embodiment including basic elements of the present invention. Referring to FIG. 12, the fifth exemplary embodiment of the present invention includes a logistics information collecting device 300 and a certified acquisition request processing part 540.

The logistics information collecting device 300 collects information from a transportable type memory storage device (not shown).

The certified acquisition request processing part 540, when receiving a certified acquisition request 700 including the proof logistics information 790 which is at least a part of the logistics information 600 collected from the transportable type memory storage device, examines whether the proof logistics information 790 included in the received certified acquisition request 700 matches with any of parts of the logistics information 600 collected from the same transportable type memory storage device. Continuously, the certified acquisition request processing part 540 determines whether the logistics information 600 is to be transmitted to a transmission source of the certified acquisition request 700 based on this examination result.

The first effect in this exemplary embodiment mentioned above is a point that it can enable to reduce a burden of setting and management of access rules for the access control which shares the logistics information 600 of specific goods only among a plurality of data servers 500 relating to the logistics of these goods. The reason is because it is configured so that it may determine whether the requested information is to be transmitted or not based on the information collected from the transportable type memory storage device.

Each component described in each exemplary embodiment mentioned above may configure, for example, to cause a computer to execute predetermined processing by a program.

Each component described in each exemplary embodiment mentioned above is not necessarily an independent existence, it may be the configuration such that a plurality of components are realized as one module, one component is realized by a plurality of modules, a certain component is a part of the other component, and a part of a certain component is overlapped to a part of the other component.

Further, according to each exemplary embodiment described above, a plurality of operation has been described in number order by the form of the flowchart, however the order of the description does not limit the order for executing a plurality of operation. For this reason, when each exemplary embodiment is carried out, the order of the plurality of operation can be changed in the range without causing a trouble in the contents.

Further, according to each exemplary embodiment described above, each of the plurality of operation is not limited to be executed at different timing. For example, it may be the configuration such that other operation occurs during execution of a certain operation, and execution timing of other operation is overlapped to a part to all of the execution timing of a certain operation.

Further, according to each exemplary embodiment described above, it is described that a certain operation becomes a trigger of other operation, however, such description is not limited to all relations between a certain operation and other operation. For this reason, when each exemplary embodiment is carried out, the relation of the plurality of operation can be changed in the range without causing a trouble in the contents. Also, a specific description of each operation of each component does not limit each operation of each component. For this reason, each specific operation of each component may be changed in the range without causing a trouble in functional, efficient and other characteristics when carrying out each exemplary embodiment.

Further, each component according to each exemplary embodiment described above may be realized by hardware, it may be realized by software, and it may be realized by mixture of hardware and software, as needed if possible.

The physical composition of each component is not limited to the description of above mentioned exemplary embodiments, and it may exist independently, it may exist in combined, or, it may be configured in separated.

While this invention has been particularly shown and described with reference to exemplary embodiments (and embodiments) thereof, the invention is not limited to those specific exemplary embodiments (and embodiments). It will be understood by those of ordinary skill in the art that various changes in form and details may be made therein without departing from the spirit and scope of the present invention.

This application is based upon and claims the benefit of priority from Japanese Patent Application No. 2009-071217, filed on Mar. 24, 2009, the disclosure of which is incorporated herein in its entirety by reference.

FIELD OF INDUSTRIAL APPLICATION

The present invention can apply to access control of a system such as represented by the traceability system which shares information among a plurality of data servers, or to automation of the access control.

DESCRIPTION OF THE REFERENCE NUMERALS 100 input/output device
200 transportable type memory storage device
300 logistics information collecting device
400 logistics information address resolution device
500 data server
510 logistics information storage part
520 communication part
530 certified acquisition request creation part
540 certified acquisition request processing part
600 logistics information
620 unique identifier
630 event time
650 read point
660 existing location of tag 670 sensor data
671 measurement start time
672 measurement stop time
673 measurement interval
674 measured value
675 irreversible summary information
700 certified acquisition request
710 acquisition identifier
720 unique identifier
730 event time
750 read point
760 existing location of tag
770 sensor data
771 measurement start time
772 measurement stop time
773 measurement interval
774 measured value
775 irreversible summary information
790 proof logistics information

The invention claimed is:

1. An information sharing system comprising:
a transportable storage device which receives first information in a first logistics process and second information in a second logistics process and stores the first information and the second information;
an information collecting device which collects said first information and said second information from said transportable storage device: and
a data server which includes a certified acquisition request creating part and a certified acquisition request processing part, and which is connected with said information collecting device and receives said first information and said second information from said connected information collecting device,
wherein said certified acquisition request creating part transmits a certified acquisition request including proof information containing at least a part of said second information, and
wherein said certified acquisition request processing part transmits said first information to a device equipped with the acquisition request creating part which is a transmission source of said certified acquisition request, based on an examination result of whether said proof information included in said received certified acquisition request matches with any of parts of said first information in the first logistics process.

2. The information sharing system according to claim 1, wherein said proof information includes a unique identifier of said transportable storage device.

3. The information sharing system according to claim 1,
wherein said proof information includes an information occurring time of said second information included in said second information, and
wherein said certified acquisition request processing part determines whether said first information is transmitted to the device equipped with the certified acquisition request creation part which is the transmission source of said certified acquisition request, based on an examination result of whether said information occurring time matches with any of time between a measurement start time and a measurement stop time included in said first information.

4. The information sharing system according to any one of claim 1,
wherein said proof information includes a measurement start time of said second information and a measurement stop time of said second information included in said second information and a measured value included in said second information at the time between said measurement start time and said measurement stop time, and
wherein said certified acquisition request processing part determines whether said first information is transmitted to a device equipped with the certified acquisition request creation part which is the transmission source of said certified acquisition request, based on an examination result of whether the measured value included in said proof information matches with a measured value included in said first information at the time between the measurement start time and the measurement stop time included in said proof information.

5. The information sharing system according to any one of claim 1,
wherein said proof information includes a measurement start time of said second information and a measurement stop time of said second information included in said second information and an irreversible summary of a measured value included in said second information at the time between said measurement start time and said measurement stop time, and
wherein said certified acquisition request processing part determines whether said first information is transmitted to the device equipped with the certified acquisition request creation part which is the transmission source of said certified acquisition request, based on an examination result of whether the irreversible summary included in said proof information matches with the irreversible summary of the measured value included in said first information at the time between the measurement start time and the measurement stop time included in said proof information.

6. The information sharing system according to claim 5, wherein said irreversible summary is hash value of said measured value.

7. The information sharing system according to claim 1,
wherein said certified acquisition request creation part transmits the certified acquisition request which further includes an acquisition identifier which is an identifier to specify said first information of acquisition target, and
wherein said certified acquisition request processing part determines whether said first information is transmitted to the device equipped with the certified acquisition request creation part which is the transmission source of said certified acquisition request, based on an examination result of whether said proof information which is included in said received certified acquisition request matches with any of parts of the first information corresponding to the acquisition identifier included in said certified acquisition request.

8. The information sharing system according to claim 7, wherein said identifier is a unique identifier of said transportable storage device.

9. The information sharing system according to claim 8, wherein said proof information is said identifier.

10. The information sharing system according to any one of claim 7,
wherein said proof information includes an information occurring time of said second information included in said second information, and
wherein said certified acquisition request processing part determines whether said first information is transmitted to the device equipped with the certified acquisition request creation part which is the transmission source of said certified acquisition request, based on an examination result of whether said information occurring time matches with any of time between a measurement start time and a measurement stop time of said first information included in said first information which is corresponding to the acquisition identifier included in said certified acquisition request.

11. The information sharing system according to any one of claim 7,
wherein said proof information includes a measurement start time of said second information and a measurement stop time of said second information included in said second information and a measured value included in said second information at the time between said measurement start time and said measurement stop time, and
wherein said certified acquisition request processing part determines whether said first information is transmitted to the device equipped with the certified acquisition request creation part which is the transmission source of said certified acquisition request, based on an examination result of whether the measured value included in said proof information matches with the measured value included in said first information which is corresponding to the acquisition identifier included in said certified acquisition request at the time between the measurement start time and the measurement stop time included in said proof information.

12. The information sharing system according to any one of claim 7
wherein said proof information includes a measurement start time of said second information and a measurement stop time of said second information included in said second information and an irreversible summary of a measured value included in said second information at the time between said measurement start time and said measurement stop time, and
wherein said certified acquisition request processing part determines whether said first information is transmitted to the device equipped with the certified acquisition request creation part which is the transmission source of said certified acquisition request, based on an examination result of whether the irreversible summary included in said proof information matches with the irreversible summary of the measured value included in said first information which is corresponding to the acquisition identifier included in said certified acquisition request at the time between the measurement start time and the measurement stop time included in said proof information.

13. An information sharing device comprising:
an information collecting device which collects first information in
a first logistics process from a transportable storage device receives the first information in the first logistics process and second information in a second logistics process and stores the first information and the second information; and
a data server which includes a certified acquisition request processing part and which is connected with said information collecting device and receives said first information and said second information from said connected information collecting device,
wherein the certified acquisition request processing part, in a case where having received a certified acquisition request including proof information containing at least a part of said second information in said second logistics process which is information collected from said transportable storage device, transmits said first information to a transmission source of said certified acquisition request, based on an examination result of whether said proof information included in said received certified acquisition request matches with any of parts of said first information in the first logistics process.

14. The information sharing device according to claim 13, wherein said proof information is a unique identifier of said transportable storage device.

15. The information sharing device according to claim 13,
wherein said proof information includes an information occurring time of said second information included in said second information, and
wherein said certified acquisition request processing part determines whether said first information is transmitted to the transmission source of said certified acquisition request, based on an examination result of whether said information occurring time matches with any of time between a measurement start time and a measurement stop time of said first information included in said first information.

16. The information sharing device according to any one of claim 13,
wherein said proof information includes a measurement start time of said second information and a measurement stop time of said second information included in said second information and a measured value included in said second information at the time between said measurement start time and said measurement stop time, and
wherein said certified acquisition request processing part determines whether said first information is transmitted to the transmission source of said certified acquisition request, based on an examination result of whether the measured value included in said proof information matches with the measured value included in said first information at the time between the measurement start time and the measurement stop time included in said proof information.

17. The information sharing device according to any one of claim 13,
wherein said proof information includes a measurement start time of said second information and a measurement stop time of said second information included in said second information and an irreversible summary of a measured value included in said second information at the time between said measurement start time and said measurement stop time, and
wherein said certified acquisition request processing part determines whether said first information is transmitted to the transmission source of said certified acquisition request, based on an examination result of whether the irreversible summary included in said proof information matches with the irreversible summary of the measured value included in said first information at the time between the measurement start time and the measurement stop time included in said proof information.

18. The information sharing device according to claim 17, wherein said irreversible summary is hash value of said measured value.

19. The information sharing device according to claim 13,
wherein said certified acquisition request further includes an identifier which specifies said first information of acquisition target, and
wherein said certified acquisition request processing part determines whether said first information is transmitted to the transmission source of said certified acquisition request, based on an examination result of whether said proof information which is included in said received certified acquisition request matches with any of parts of said first information specified by said identifier.

20. The information sharing device according to claim 19, wherein said identifier is a unique identifier of said transportable storage device.

21. The information sharing device according to claim 20, wherein said proof information is said identifier.

22. The information sharing device according to any one of claim 19,
wherein said proof information includes an information occurring time of said second information included in said second information, and
wherein said certified acquisition request processing part determines whether said first information is transmitted to the transmission source of said certified acquisition request, based on an examination result of whether said information occurring time matches with any of time between a measurement start time and a measurement stop time of said first information included in said first information which is corresponding to the acquisition identifier included in said certified acquisition request.

23. The information sharing device according to any one of claim 19,
wherein said proof information includes a measurement start time of said second information and a measurement stop time of said second information included in said second information and a measured value included in said second information at the time between said measurement start time and said measurement stop time, and
wherein said certified acquisition request processing part determines whether said first information is transmitted to the transmission source of said certified acquisition request, based on an examination result of whether the measured value included in said proof information matches with the measured value included in said first information which is corresponding to the acquisition identifier included in said certified acquisition request at the time between the measurement start time and the measurement stop time included in said proof information.

24. The information sharing device according to any one of claim 19,
wherein said proof information includes a measurement start time of said second information and a measurement stop time of said second information included in said second information and an irreversible summary of a measured value included in said second information at the time between said measurement start time and said measurement stop time, and
wherein said certified acquisition request processing part determines whether said first information is transmitted to the transmission source of said certified acquisition request, based on an examination result of whether the irreversible summary included in said proof information matches with the irreversible summary of the measured value included in said first information which is corresponding to the acquisition identifier included in said certified acquisition request at the time between the measurement start time and the measurement stop time included in said proof information.

25. An information sharing method comprising:
collecting first information in a first logistics process from a transportable storage device which receives the first information in the first logistics process and second information in a second logistics process and stores the first information and the second information; and
transmitting said first information to a transmission source of a certified acquisition request, in a case where having received said certified acquisition request including proof information containing at least a part of second information in the second logistics process which is information collected from said transportable storage device, based on an examination result of whether said proof information included in said received certified acquisition request matches with any of parts of said first information in the first logistics process.

26. The information sharing method according to claim 25, wherein said proof information is a unique identifier of said transportable storage device.

27. The information sharing method according to claim 25,
wherein said proof information includes an information occurring
time of said second information included in said second information, and
determining whether said first information is transmitted to the transmission source of said certified acquisition request, based on an examination result of whether said information occurring time matches with any of time between a measurement start time and a measurement stop time of said first information included in said first information.

28. The information sharing method according to any one of claim 25, wherein said proof information includes a measurement start time of said second information and a measurement stop time of said second information included in said second information and a measured value included in said second information at the time between said measurement start time and said measurement stop time, and
determining whether said first information is transmitted to the transmission source of said certified acquisition request, based on an examination result of whether the measured value included in said proof information matches with the measured value included in said first information at the time between the measurement start time and the measurement stop time included in said proof information.

29. The information sharing method according to any one of claim 25, wherein said proof information includes a measurement start time of said second information and a measurement stop time of said second information included in said second information and an irreversible summary of a measured value included in said second information at the time between said measurement start time and said measurement stop time, and
determining whether said first information is transmitted to the transmission source of said certified acquisition request, based on an examination result of whether the irreversible summary included in said measurement start time and the measurement stop time included in said proof information.

30. The information sharing method according to claim 29, wherein said irreversible summary is hash value of said measured value.

31. The information sharing method according to claim 25,
wherein said certified acquisition request further includes an identifier which specifies said first information of acquisition target, and
determining whether said first information is transmitted to the transmission source of said certified acquisition request, based on an examination result of whether said proof information which is included in said received certified acquisition request matches with any of parts of said first information specified by said identifier.

32. The information sharing method according to claim 31, wherein said identifier is a unique identifier of said transportable storage device.

33. The information sharing method according to claim 32, wherein said proof information is said identifier.

34. The information sharing method according to any one of claim 31, wherein said proof information includes an information occurring time of said second information included in said second information, and
determining whether said first information is transmitted to the transmission source of said certified acquisition request, based on an examination result of whether said information occurring time matches with any of time between a measurement start time and a measurement stop time of said first information included in said first information which is corresponding to the acquisition identifier included in said certified acquisition request.

35. The information sharing method according to any one of claim 31, wherein said proof information includes a measurement start time of said second information and a measurement stop time of said second information included in said second information and a measured value included in said second information at the time between said measurement start time and said measurement stop time, and
determining whether said first information is transmitted to the transmission source of said certified acquisition request, based on an examination result of whether the measured value included in said proof information matches with the measured value included in said first information which is corresponding to the acquisition identifier included in said certified acquisition request at the time between the measurement start time and the measurement stop time included in said proof information.

36. The information sharing method according to any one of claim 31, wherein said proof information includes a measurement start time of said second information and a measurement stop time of said second information included in said second information and an irreversible summary of a measured value included in said second information at the time between said measurement start time and said measurement stop time, and
determining whether said first information is transmitted to the transmission source of said certified acquisition request, based on an examination result of whether the irreversible summary included in said proof information matches with the irreversible summary of the measured value included in said first information which is corresponding to the acquisition identifier included in said certified acquisition request at the time between the measurement start time and the measurement stop time included in said proof information.

37. A non-transitory computer-readable recording medium recording thereon a program which is causing a computer to execute processing of: collecting first information in a first logistics process from a transportable storage device which receives the first information in the first logistics process and second information in a second logistics process and stores the first information and the second information; and
transmitting said first information to a transmission source of a certified acquisition request, in a case where having received said certified acquisition request including proof information containing at least a part of second information in the second logistics process which is information collected from said transportable storage device, based on an examination result whether said proof information included in said received certified acquisition request matches with any of parts of said first information in the first logistics process.

38. The non-transitory computer-readable recording medium recording thereon the program according to claim 37, wherein said proof information is a unique identifier of said transportable storage device.

39. The non-transitory computer-readable recording medium recording thereon the program according to claim 37, wherein said proof information includes an information occurring time of said second information included in said second information, causing a computer to execute processing of:
determining whether said first information is transmitted to the transmission source of said certified acquisition request, based on an examination result of whether said information occurring time matches with any of time between a measurement start time and a measurement stop time of said first information included in said first information.

40. The non-transitory computer-readable recording medium recording thereon the program according to any one of claim 37, wherein said proof information includes a measurement start time of said second information and a measurement stop time of said second information included in said second information and a measured value included in said second information at the time between said measurement start time and said measurement stop time, causing a computer to execute processing of:
determining whether said first information is transmitted to the transmission source of said certified acquisition request, based on an examination result of whether the measured value included in said proof information matches with the measured value included in said first information at the time between the measurement start time and the measurement stop time included in said proof information.

41. The non-transitory computer-readable recording medium recording thereon the program according to any one of claim 37, wherein said proof information includes a measurement start time of said second information and a measurement stop time of said second information included in said second information and an irreversible summary of a measured value included in said second information at the time between said measurement start time and said measurement stop time, causing a computer to execute processing of:
determining whether said first information is transmitted to the transmission source of said certified acquisition request, based on an examination result of whether the irreversible summary included in said proof information matches with the irreversible summary of the measured value included in said first information at the time between the measurement start time and the measurement stop time included in said proof information.

42. The non-transitory computer-readable recording medium recording thereon the program according to claim 41, wherein said irreversible summary is hash value of said measured value.

43. The non-transitory computer-readable recording medium recording thereon the program according to claim 37, wherein said certified acquisition request further includes an identifier which specifies said first information of acquisition target, causing a computer to execute processing of:
determining whether said first information is transmitted to the transmission source of said certified acquisition request, based on an examination result of whether said proof information which is included in said received certified acquisition request matches with any of parts of said first information specified by said identifier.

44. The non-transitory computer-readable recording medium recording thereon the program according to claim 43, wherein said identifier is a unique identifier of said transportable storage device.

45. The non-transitory computer-readable recording medium recording thereon the program according to claim 44, wherein said proof information is said identifier.

46. The non-transitory computer-readable recording medium recording thereon the program according to any one of claim 43, wherein said proof information includes an information occurring time of said second information included in said second information, causing a computer to execute processing of:
   determining whether said first information is transmitted to the transmission source of said certified acquisition request, based on an examination result of whether said information occurring time matches with any of time between a measurement start time and a measurement stop time of said first information included in said first information which is corresponding to the acquisition identifier included in said certified acquisition request.

47. The non-transitory computer-readable recording medium recording thereon the program according to any one of claim 43, wherein said proof information includes a measurement start time of said second information and a measurement stop time of said second information included in said second information and a measured value included in said second information at the time between said measurement start time and said measurement stop time, causing a computer to execute processing of:
   determining whether said first information is transmitted to the transmission source of said certified acquisition request, based on an examination result of whether the measured value included in said proof information matches with the measured value included in said first information which is corresponding to the acquisition identifier included in said certified acquisition request at the time between the measurement start time and the measurement stop time included in said proof information.

48. The non-transitory computer-readable recording medium recording thereon the program according to any one of claim 43, wherein said proof information includes a measurement start time of said second information and a measurement stop time of said second information included in said second information and an irreversible summary of a measured value included in said second information at the time between said measurement start time and said measurement stop time, causing a computer to execute processing of:
   determining whether said first information is transmitted to the transmission source of said certified acquisition request, based on an examination result of whether the irreversible summary included in said proof information matches with the irreversible summary of the measured value included in said first information which is corresponding to the acquisition identifier included in said certified acquisition request at the time between the measurement start time and the measurement stop time included in said proof information.

49. An information sharing system comprising:
a transportable storage means for receiving first information in a first logistics process and second information in a second logistics process and storing the first information and the second information; and
a certified acquisition request creating means and a certified acquisition request processing means for receiving said first information and said second information;
wherein said certified acquisition request creating means transmits a certified acquisition request including proof information containing at least a means of said second information, and
wherein said certified acquisition request processing means transmits said first information to a device equipped with the acquisition request creating means which is a transmission source of said certified acquisition request, based on an examination result of whether said proof information included in said received certified acquisition request matches with any means of said first information in the first logistics process.

50. An information sharing device comprising:
an information collecting means for collecting first information in a first logistics process from a transportable storage means which receives the first information in the first logistics process and second information in a second logistics process and stores the first information and the second information; and
a certified acquisition request processing means for, in a case where having received a certified acquisition request including proof information containing at least a part of said second information in said second logistics process which is information collected from said transportable storage means, transmitting said first information to a transmission source of said certified acquisition request, based on an examination result of whether said proof information included in said received certified acquisition request matches with any means of said first information in the first logistics process.

* * * * *

UNITED STATES PATENT AND TRADEMARK OFFICE
CERTIFICATE OF CORRECTION

PATENT NO. : 8,776,172 B2  
APPLICATION NO. : 13/260093  
DATED : July 8, 2014  
INVENTOR(S) : Kentaro Yamasaki Page 1 of 1

It is certified that error appears in the above-identified patent and that said Letters Patent is hereby corrected as shown below:

In the Specification

Column 10, Line 61: Delete "223," and insert -- S223, --

In the Claims

Column 19, Line 63: In Claim 4, delete "any one of claim" and insert -- claim --
Column 20, Line 14: In Claim 5, delete "any one of claim" and insert -- claim --
Column 20, Line 57: In Claim 10, delete "any one of claim" and insert -- claim --
Column 21, Line 6: In Claim 11, delete "any one of claim" and insert -- claim --
Column 21, Line 26: In Claim 12, delete "any one of claim" and insert -- claim --
Column 22, Line 21: In Claim 16, delete "any one of claim" and insert -- claim --
Column 22, Line 38: In Claim 17, delete "any one of claim" and insert -- claim --
Column 23, Line 8: In Claim 22, delete "any one of claim" and insert -- claim --
Column 23, Line 23: In Claim 23, delete "any one of claim" and insert -- claim --
Column 23, Line 42: In Claim 24, delete "any one of claim" and insert -- claim --
Column 24, Line 26: In Claim 28, delete "any one of claim" and insert -- claim --
Column 24, Line 41: In Claim 29, delete "any one of claim" and insert -- claim --
Column 25, Line 6: In Claim 34, delete "any one of claim" and insert -- claim --
Column 25, Line 18: In Claim 35, delete "any one of claim" and insert -- claim --
Column 25, Line 35: In Claim 36, delete "any one of claim" and insert -- claim --
Column 26, Line 22: In Claim 40, delete "any one of claim" and insert -- claim --

Signed and Sealed this  
Tenth Day of February, 2015

Michelle K. Lee  
*Deputy Director of the United States Patent and Trademark Office*